United States Patent
Cho et al.

(10) Patent No.: US 8,062,800 B2
(45) Date of Patent: Nov. 22, 2011

(54) CATALYST FOR REFORMER USED IN FUEL CELL SYSTEM, REFORMER, AND FUEL CELL SYSTEM COMPRISING SAME

(75) Inventors: Eun-Suk Cho, Suwon-si (KR); Zin Park, Suwon-si (KR); In-Hyuk Son, Suwon-si (KR); Dong-Myung Suh, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 1151 days.

(21) Appl. No.: 11/490,203

(22) Filed: Jul. 21, 2006

(65) Prior Publication Data

US 2007/0020161 A1 Jan. 25, 2007

(30) Foreign Application Priority Data

Jul. 22, 2005 (KR) .................. 10-2005-0066679

(51) Int. Cl.
*H01M 8/00* (2006.01)
*H01M 8/04* (2006.01)
*H01M 8/06* (2006.01)

(52) U.S. Cl. .................. 429/423; 429/408; 429/416

(58) Field of Classification Search .......... 429/12–46
See application file for complete search history.

(56) References Cited

U.S. PATENT DOCUMENTS

| 5,656,567 A * | 8/1997 | Heywood ............... 502/339 |
| 2002/0132155 A1 * | 9/2002 | Shikada et al. ............... 429/40 |
| 2002/0172630 A1 * | 11/2002 | Ahmed et al. ............... 422/190 |

FOREIGN PATENT DOCUMENTS

JP 04-160002 6/1992

* cited by examiner

*Primary Examiner* — Barbara Gilliam
*Assistant Examiner* — Steven Scully
(74) *Attorney, Agent, or Firm* — Robert E. Bushnell, Esq.

(57) ABSTRACT

A catalyst for a reformer of a fuel cell system, a reformer for a fuel cell system including the catalyst, and a fuel cell system including the reformer are provided. The reformer includes a first reacting region that generates heat energy through oxidation of fuel and includes an oxidation catalyst having a Pd catalyst supported by an $Al_2O_3$ carrier and a Pt catalyst supported by an $Al_2O_3$ carrier, and a second reacting region that generates hydrogen gas from the fuel through a reforming reaction by the heat energy. The reformer includes at least two pipes each having an independent internal space and letting the fuel containing hydrogen pass therethrough.

17 Claims, 7 Drawing Sheets

US 8,062,800 B2

CATALYST FOR REFORMER USED IN FUEL CELL SYSTEM, REFORMER, AND FUEL CELL SYSTEM COMPRISING SAME

CROSS-REFERENCE TO RELATED APPLICATION

This application claims priority to and the benefit of Korean Patent Application No. 10-2005-0066679 filed in the Korean Intellectual Property Office on Jul. 22, 2005, the entire content of which is incorporated herein by reference.

BACKGROUND OF THE INVENTION

1. Field of the Invention

The present invention relates to a catalyst for a reformer of a fuel cell system, to a reformer for a fuel cell system including the catalyst, and to a fuel cell system including the reformer. More particularly, the present invention relates to a catalyst that can effectively induce a reforming oxidation reaction in a reformer of a fuel cell system.

2. Description of the Related Art

A fuel cell is an electrochemical energy conversion device which changes chemical energy into electrical energy through an electrochemical redox reaction of an oxidant and a fuel such as hydrogen and a hydrocarbon-based material including methanol, ethanol, natural gas, and the like.

The fuel cell is a clean energy source that can replace fossil fuels. It includes a fuel cell stack composed of unit cells layered and combined in series and/or parallel and produces various ranges of power output. Since it has four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC).

The direct oxidation fuel cell includes a direct methanol fuel cell that uses methanol as a fuel.

The polymer electrolyte fuel cell has advantages such as high power output density and energy conversion efficiency, operability at room temperature, and can be down-sized and tightly sealed. Therefore, it can be applied to a wide array of fields such as non-polluting automobiles, household electricity generation systems, and portable power sources for mobile communication equipment, military equipment, and the like.

A fuel cell system is composed of a fuel cell stack, a reformer, a fuel tank, and a fuel pump.

The fuel cell stack constitutes a body of a fuel cell, and the fuel pump supplies a fuel in the fuel tank to the reformer.

The reformer reforms the fuel to generate hydrogen gases, and supplies the hydrogen gases to the fuel cell stack.

In general, the reformer of a fuel cell system includes a reforming reaction part and a carbon monoxide reduction part. The reforming reaction part generates hydrogen gas from the fuel through a reforming catalyst reaction by thermal energy. The carbon monoxide reduction part reduces a concentration of carbon monoxide included in the hydrogen gases through an oxidation reaction of the hydrogen gas and oxygen.

The reforming reaction is performed by the reforming catalyst and therefore many researches have been made to increase activity of reforming catalysts.

The above information disclosed in this background section is only for enhancement of understanding of the background of the invention and therefore, it should be understood that the above information may contain information that does not form the prior art that is already known in this country to a person or ordinary skill in the art.

SUMMARY OF THE INVENTION

One embodiment of the present invention provides a catalyst for a reformer of a fuel cell system that has excellent reforming reaction efficiency.

Another embodiment of the present invention provides a reformer for a fuel cell system that includes the catalyst.

Yet another embodiment of the present invention provides a fuel cell system including the reformer.

According to an aspect of the present invention, provided is a catalyst for a reformer that includes a Pd catalyst supported by a carrier and a Pt catalyst supported by a carrier in a fuel cell system.

According to another aspect of the present invention, provided is a reformer for a fuel cell system that is composed of a first reacting region that generates heat energy through oxidation of the fuel and includes the catalyst, and a second reacting region that generates hydrogen gas from the fuel through a reforming reaction by the heat energy.

Preferably, the reformer includes a first pipe and a second pipe inserted into the first pipe, an internal space of the second pipe defines the first reacting region, and a space between the first pipe and the second pipe defines the second reacting region.

According to yet another aspect of the present invention, provided is a fuel cell system that includes the reformer having the above-described structure and produces hydrogen gas from fuel containing hydrogen through a catalytic chemical reaction by heat energy, and at least one electricity generator for generating electrical energy through an electrochemical reaction between the hydrogen gas and oxidant.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
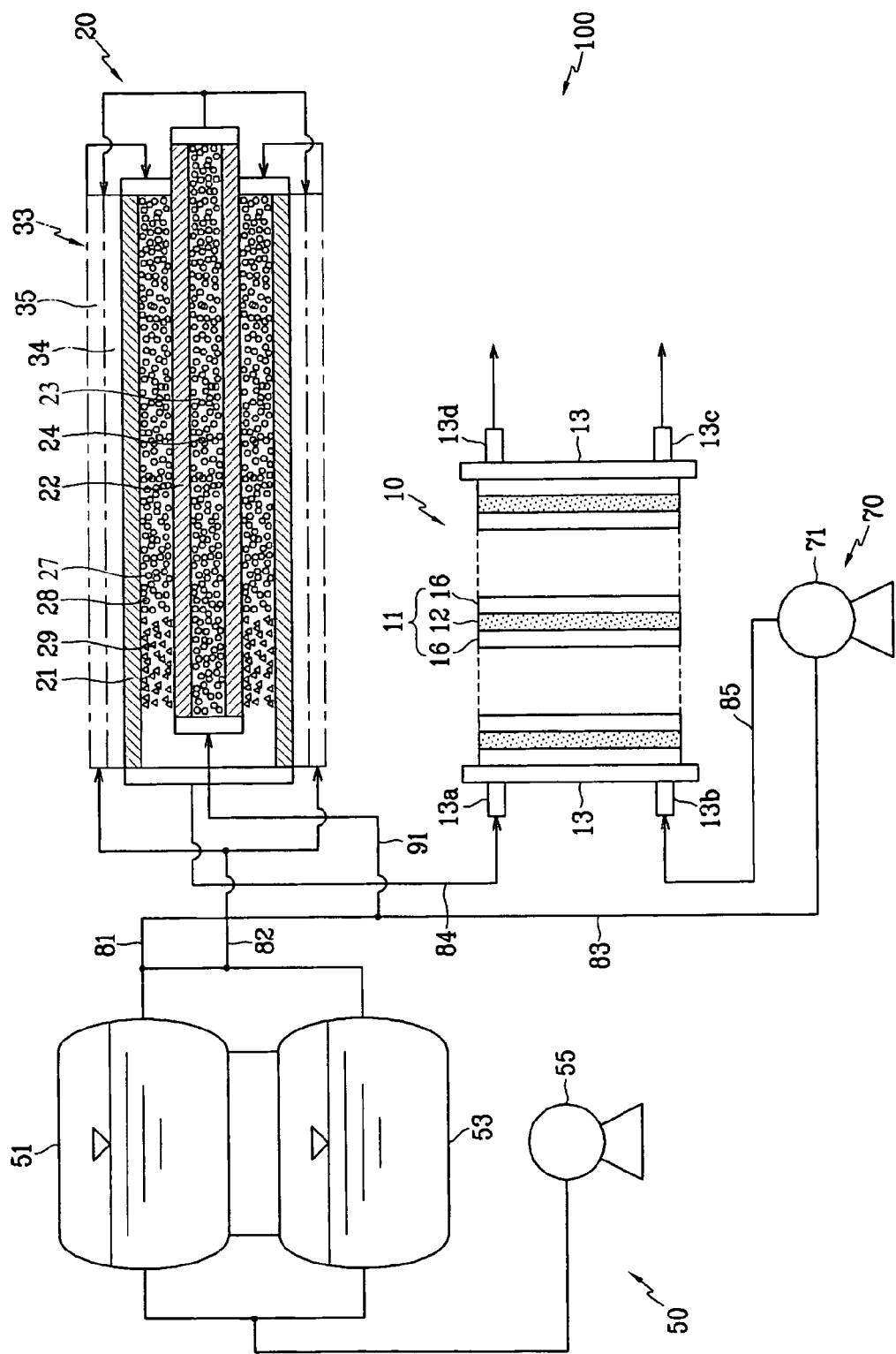
FIG. 1 is a view showing an entire fuel cell system in accordance with an embodiment of the present invention.

Reformers of conventional fuel cells are composed of a heat-emitting part and a heat-absorbing part, and heat is not directly exchanged between the heat-emitting part and the heat-absorbing part. Thus, there is a problem in the efficiency of heat transfer.

The present invention suggests a reformer with improved thermal efficiency and reaction efficiency for generating hydrogen gas.

The reformer for a fuel cell system is preferably composed of at least two pipes each having an independent internal space and letting fuel containing hydrogen pass therethrough, and includes a first reacting region that generates heat energy through oxidation of fuel and includes an oxidation catalyst, and a second reacting region that generates hydrogen gas from the fuel through a reforming reaction by the heat energy.

Examples of the catalyst for oxidation include a Pd catalyst supported by a catalyst carrier and a Pt catalyst supported by a catalyst carrier. Preferably, the catalyst for oxidation includes a Pd catalyst supported by a carrier and a Pt catalyst supported by a carrier. The preferred carrier is $Al_2O_3$ carrier.

The content of the Pd catalyst supported by the carrier, preferably $Al_2O_3$ carrier, may range from 0.5 wt % to 1.5 wt %, and the content of the Pt catalyst supported by the carrier, preferably $Al_2O_3$ carrier, may range from 0.5 wt % to 1.5 wt %.

The mixing ratio of the Pd catalyst supported by the carrier, preferably $Al_2O_3$ carrier, to the Pt catalyst supported by the carrier, preferably $Al_2O_3$ carrier, may be 99 to 90: 1 to 10 volume %.

When the Pt catalyst supported by the carrier is used less than 1 volume %, no oxidation reaction occurs at room temperature. When the Pt catalyst supported by the carrier is used more than 10 volume %, the content of carbon monoxide (CO) increases among the gas generated from the oxidation reaction and this is not desirable.

The Pt catalyst supported by the carrier generates sufficient heat to initiate a combustion reaction in catalyst layers of an anode and a cathode. Thus, the reformer does not require an additional heater.

This can simplify the structure of the reformer.

The second reacting region is positioned in the inside of the first reacting region.

The second reacting region includes a reforming catalyst that generates hydrogen gas from the fuel through the catalytic reforming reaction. It may further include a water gas shift (WGS) catalyst for reducing the concentration of carbon monoxide in the hydrogen gas.

The reformer of the present embodiment further includes a heat transfer unit for transferring the heat energy generated in the first reacting region to the fuel supplied to the second reacting region.

An embodiment of the heat transfer unit includes: a first passing member coiling around the external circumferential surface of the first pipe and being communicated with the first reacting region; and a second passing member coiling around an external circumferential surface of the first pipe to contact the first passing member and being communicated with the second reacting region.

Hereinafter, the fuel cell system of embodiments of the present invention will be described in detail, with reference to the accompanying drawings.

However, it is obvious to those skilled in the art of the present invention that the present invention can be realized in various different forms and it is not limited by the drawings.

FIG. 1 shows a structure of a fuel cell system in accordance with an embodiment of the present invention.

In the fuel cell system 100 of an embodiment of the present invention, fuel for generating electricity includes water and fossil fuels such as methanol and ethanol.

The fuel cell system 100 may use oxygen or air, but not limited thereto, as an oxidant to be reacted with the fuel.

Referring to FIG. 1, the fuel cell system 100 of the embodiment of the present invention includes a reformer 20 for generating hydrogen gas from liquid fuel, a fuel cell stack 10 for generating electricity by converting a chemical reaction energy generated from an electrochemical reaction between the hydrogen gas and an oxidant into electrical energy, a fuel supplier 50 for providing fuel to the reformer 20, and an oxidant supplier 70 for supplying an oxidant to the fuel cell stack 10 and the reformer 20.

The present embodiment of the fuel cell system 100 adopts a polymer electrolyte membrane fuel cell (PEMFC) system in which hydrogen gas is generated from the fuel in the reformer 20 and supplied to the fuel cell stack 10, and electrical energy is generated through an electrochemical reaction between the hydrogen gas and the oxidant.

The fuel supplier 50 includes a first tank 51 for storing liquid fuel, a second tank 53 for storing water, and a fuel pump 55 connected to the first and second tanks 51 and 53.

The oxidant supplier 70 includes an air pump 71 for sucking air with a predetermined pumping force.

The reformer 20 receives fuel from the fuel supplier 50, generates hydrogen gas, and supplies the hydrogen gas to the fuel cell stack 10. The structure of the reformer 20 will be described in detail with reference to the accompanying drawings.

Figure 2:
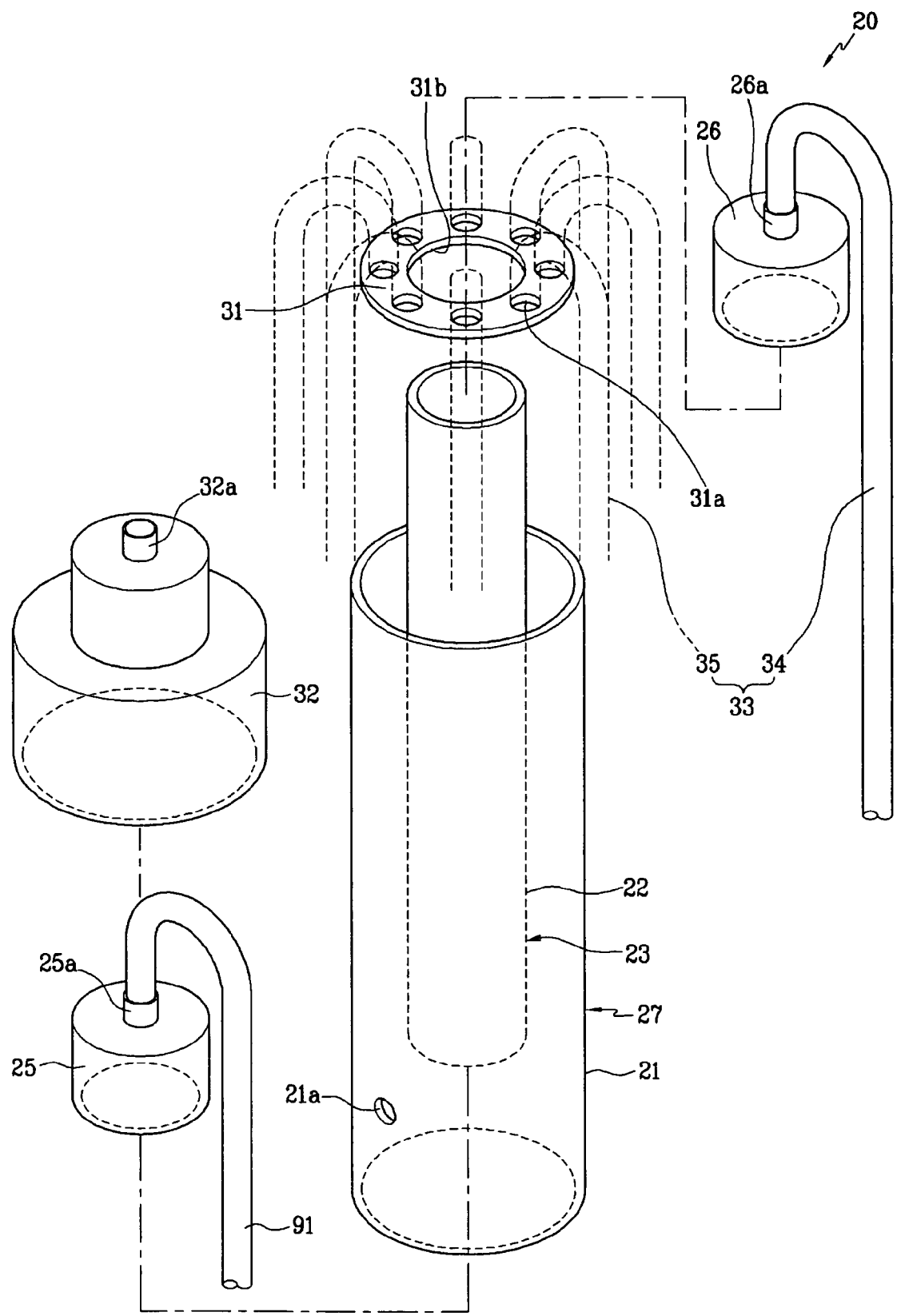
FIG. 2 is an exploded perspective view describing a structure of a reformer in accordance with a first embodiment of the present invention.
Figure 3:
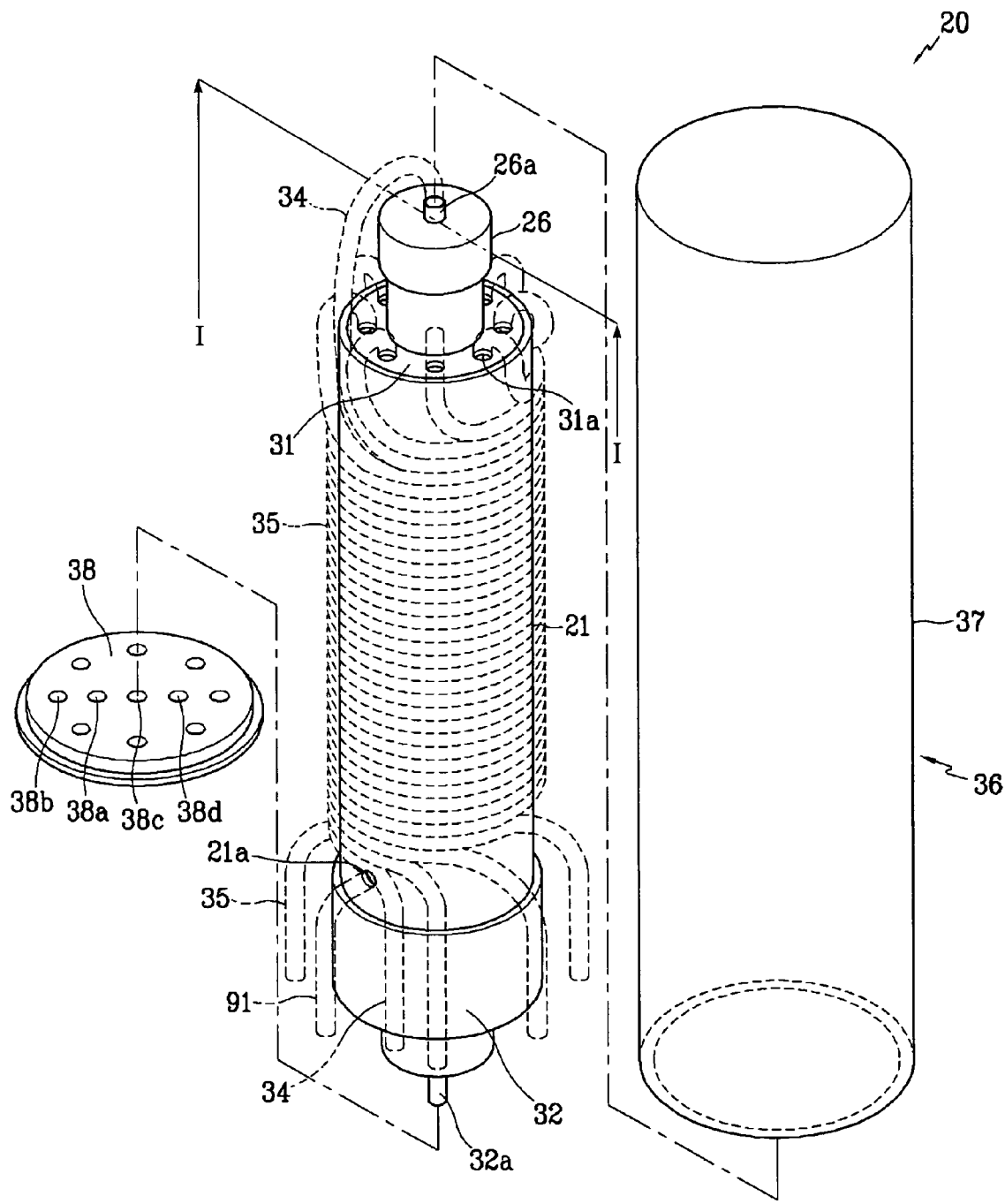
FIG. 3 is a perspective view showing parts of the reformer of FIG. 2 assembled with each other.
Figure 4:
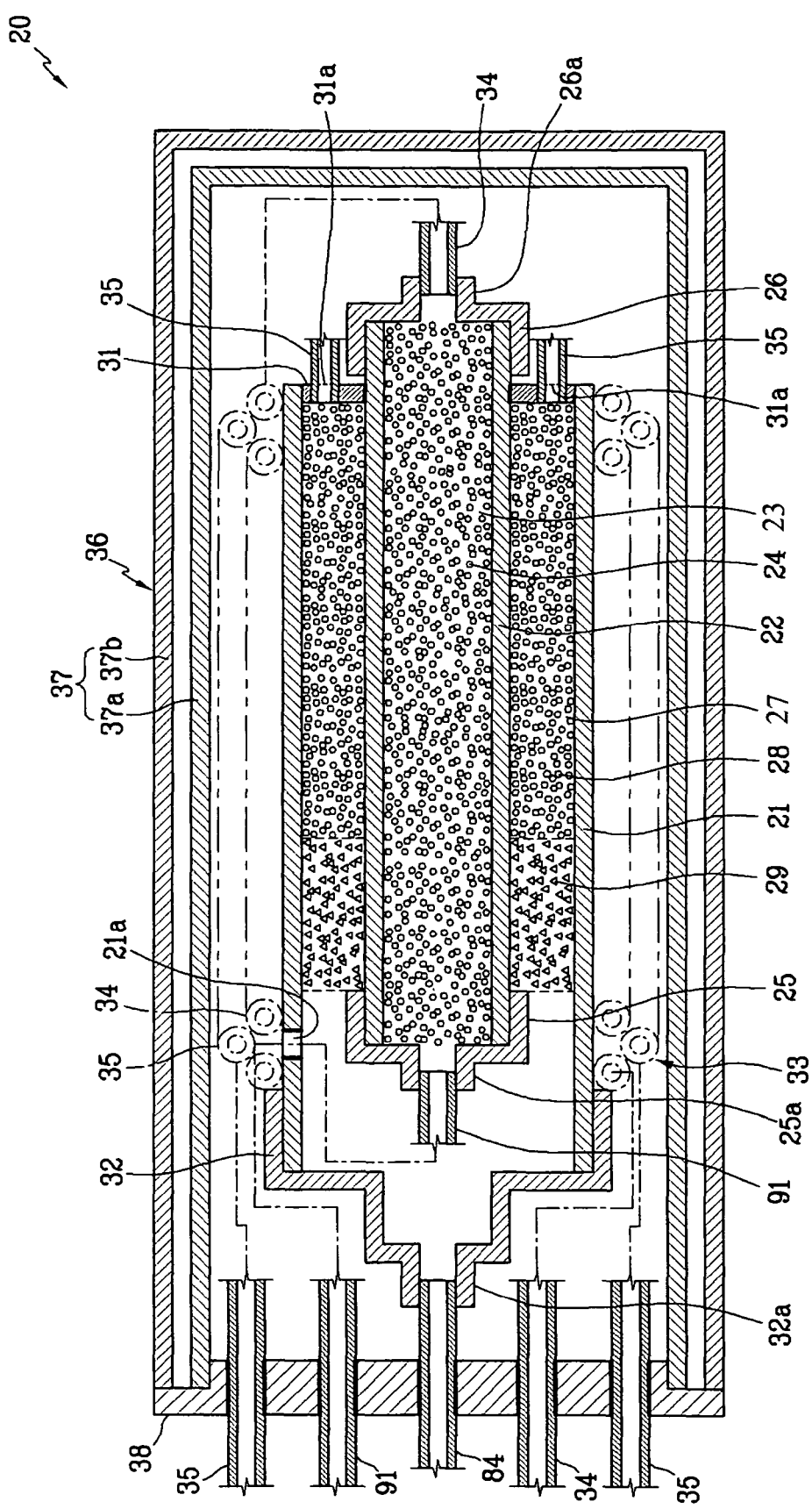
FIG. 4 is a cross-sectional view at line I-I of the assembled parts shown in FIG. 3.

FIG. 2 is an exploded perspective view illustrating a structure of the reformer 20 in accordance with a first embodiment of the present invention, FIG. 3 is a perspective view showing parts of the reformer of FIG. 2 assembled with each other, and FIG. 4 is a cross-sectional view at line I-I of the assembled parts shown in FIG. 3.

Referring to FIGS. 1 to 4, the reformer 20 of the embodiments of the present invention includes a first reacting region 23 generating heat energy through an oxidation reaction between the liquid fuel and the oxidant and a second reacting region 27 generating hydrogen gas from the fuel mixture through a reforming reaction by the heat energy and, preferably, reducing the concentration of carbon monoxide in the hydrogen gas.

The reformer 20 may be constructed with a first pipe 21 and a second pipe 22 positioned in the inside of the first pipe 21.

The first pipe 21 has a predetermined cross-sectional area and is preferably a cylindrical pipe with both ends open.

The second pipe 22 has a smaller cross-sectional area than the first pipe 21 and is substantially a cylindrical pipe with both ends open.

Preferably, the second pipe 22 is inserted into the first pipe 21 at the center, and the external circumferential surface of the second pipe 22 is apart from the internal circumferential area of the first pipe 21 by a predetermined distance. Accordingly, the internal space of the second pipe 22 can be the first reacting region 23, and the space between the first pipe 21 and the second pipe 22 can be the second reacting region 27.

The first and second pipes 21 and 22 may be formed of a material having thermal conductivity, such as stainless steel, aluminum, copper, and iron.

The first reacting region 23 includes an oxidation catalyst 24 arranged in the internal space of the second pipe 22, an inlet 25a at one end of the second pipe 22, and an outlet 26a at the other end.

The inlet 25a is an opening for inputting liquid fuel and air into the internal space of the second pipe 22, whereas the outlet 26a is an opening for exhausting gas generated from a combustion based on an oxidation reaction between the liquid fuel and the oxidant out of the internal space.

To be specific, the first reacting region 23 is defined by the second pipe 22 and a first cap 25 having the inlet 25a at one end of the second pipe 22 and a second cap 26 having the outlet 26a at the other end.

The inlet 25a of the first cap 25 is connected to the first tank 51 and to the air pump 71 through a first supply pipe 81 and through a third supply pipe 83, respectively.

The first and third supply pipes 81 and 83 may be combined into a single conflux pipe 91, which is connected to the inlet 25a of the first cap 25.

The conflux pipe 91 may be connected to the inlet 25a through an adiabatic part 36 and the first pipe 21. The first pipe 21 includes a first through-hole 21a for letting the conflux pipe 91 pass therethrough.

The oxidation catalyst 24 is positioned in the first reacting region 23 to generate heat of a predetermined temperature by catalyzing an oxidation reaction between the liquid fuel and the air.

The oxidation catalyst 24 includes an oxidation catalyst suggested in the present invention.

A reforming catalyst 28 is positioned in second reacting region 27 (i.e., a space between the first pipeline 21 and the second pipeline 22), and inlets 31a and an outlet 32a are formed at one end and at the other end of the first pipe 21, respectively.

The inlets 31a are openings for inputting a fuel mixture of the liquid fuel and water into a space between the first pipe 21 and the second pipe 22, and the outlet 32a is an opening for discharging hydrogen gas generated from a reforming reaction of the fuel mixture out of the internal space.

Preferably, the first pipe 21 includes a third cap 31 having the inlets 31a at one end of the first pipe 21 and a fourth cap 32 having the outlet 32a at the other.

The third cap 31 is formed in a shape of cyclic flange that includes a penetrating opening 31b for letting the second pipe 22 pass therethrough, and the inlets 31a formed radially around the penetrating opening 31b.

The inlets 31a are connected to the first and second tanks 51 and 53 through a second supply pipe 82. The outlet 32a is connected to an electricity generator 11 of the fuel cell stack 10, which will be described later, through a fourth supply pipe 84.

The fourth supply pipe 84 penetrates through the adiabatic part 36 to connect the electricity generator 11 to the outlet 32a.

The reforming catalyst 28 catalyzes the reforming reaction of the fuel mixture, that is, a decomposition reaction of the fuel mixture and a transformation reaction of carbon monoxide, to generate hydrogen gas from the fuel mixture. The reforming catalyst 28 is arranged in the space between the first pipe 21 and the second pipe 22.

The reforming catalyst 28 may include a catalyst material such as copper (Cu), nickel (Ni), or platinum (Pt) supported by a pellet-type carrier such as alumina ($Al_2O_3$), silica ($SiO_2$) or titania ($TiO_2$).

The second reacting region 27 may further include a water gas shift (WGS) catalyst 29 arranged in continuum with the reforming catalyst 28 in the space between the first pipe 21 and the second pipe 22, which is shown in the drawing. That is, in the second reacting region 27, the reforming catalyst 28 and the water gas shift (WGS) catalyst 29 are arranged sequentially.

The WGS catalyst 29 reduces the concentration of carbon monoxide included in the hydrogen gas, which is produced by the reforming catalyst 28, through a WGS reaction.

The WGS catalyst 29 is preferably arranged next to the reforming catalyst 28 in view of the direction of the reactants moving route. In other words, the WGS catalyst 29 is arranged in the outlet 32a side of the fourth cap 32, and the reforming catalyst 28 is arranged in the inlet 31a side of the third cap 31, so that the fuel mixture is injected into the space between the first pipe 21 and the second pipe 22 through the inlets 31a of the third cap 31, passes through the reforming catalyst 28 to be transformed into hydrogen gas, then passes through the WGS catalyst 29, and is ejected through the outlet 32a of the fourth cap 32.

The WGS catalyst 29 includes a catalyst material such as copper (Cu), zinc (Zn), iron (Fe), or chromium (Cr) supported by a pellet-type carrier such as alumina ($Al_2O_3$), silica ($SiO_2$) or titania ($TiO_2$).

The reformer 20 of the present embodiment further includes a heat transfer unit 33 for transferring the heat energy to the fuel supplied to the second reacting region 27 to maximize the efficiency of the heat energy generated in the first reacting region 23.

The heat transfer unit 33 is composed of a first passing member 34 and a second passing member 35. The first passing member 34 transfers combustion gas of a relatively high temperature discharged from the outlet 26a of the second pipe 22 to the external circumference of the first pipe 21. The second passing member 35 transfers the heat energy transferred through the first passing member 34 to the fuel mixture supplied to the inlets 31a of the first pipe 21.

The first passing member 34 has a pipe structure coiling around the external circumferential surface of the first pipe 21.

One end of the first passing member 34 is connected to the outlet 26a of the second pipe 22 in the second cap 26. The other end of the first passing member 34 is withdrawn from the inside of the adiabatic part 36 to the outside, penetrating through the adiabatic part 36.

One end of the second passing member 35 is connected to the inlets 31a of the first pipe 21, that is, to the respective openings radially formed in the third cap 31, and the second passing member 35 has a pipe structure coiling around the external circumferential surface of the first pipe 21 to contact the first passing member 34.

The other end of the second passing member 35 is withdrawn from the inside of the adiabatic part 36 to the outside, penetrating through the adiabatic part 36. It is connected to the first and second tanks 51 and 53 through the second supply pipe 82.

In the reformer 20 having the above-described structure, the heat energy generated in the first reacting region 23 may not be completely transferred to the second reacting region 27 and may be exhausted out of the reformer 20.

Accordingly, the reaction efficiency and thermal efficiency of the reformer 20 may be deteriorated due to a temperature imbalance in the second reacting region 27.

Therefore, the reformer 20 of the present invention may further include the adiabatic part 36 for keeping the heat energy generated in the first reacting region 23 inside to improve the reaction efficiency and thermal efficiency. As aforementioned, when the heat energy generated in the first reacting region 23 is not completely transferred to the second reacting region 27 and leaks out of the reformer 20, a temperature imbalance occurs in the second reacting region 27 and the temperature imbalance deteriorates the reaction and thermal efficiencies of the reformer 20.

The adiabatic part 36 preferably includes a cylindrical body 37 with one end closed and the other end open to surround the entire first pipe 21 including the heat transfer unit 33, and a sealing cap 38 for substantially sealing the internal space of the body 37 by being connected to the open end of the body 37.

The body 37 is preferably composed of an inner wall 37a for surrounding the entire first pipe 21, and an outer wall 37b apart from the inner wall 37a by a predetermined distance and supporting and surrounding the entire inner wall 37a.

The space between the inner wall 37a and the outer wall 37b may be made vacuous.

The inner wall 37a and the outer wall 37b may be formed of an adiabatic material having relatively low heat conductivity. The examples of the adiabatic material include metal adiabatic materials, such as stainless steel, zirconium, and aluminum, and non-metal adiabatic materials such as ceramics.

The sealing cap 38 may be combined with the open end of the body 37 by a screw connection or a press-fit connection.

The conflux pipe 91 for supplying the liquid fuel and air into the internal space of the second pipe 22 penetrates through the sealing cap 38 and the first pipe 21 to be connected to the inlet 25a of the second pipe 22.

The second passing member 35 for supplying the fuel mixture into the space between the first pipe 21 and the second pipe 22 may be withdrawn from the internal space of the body 37 to the outside of the internal space, penetrating through the sealing cap 38.

The fourth supply pipe 84 connected to the electricity generator 11 of the fuel cell stack 10, which will be described later, may be connected to the outlet 32a of the first pipe 21, penetrating through the sealing cap 38.

Also, the first passing member 34 for exhausting combustion gas produced from a reaction between the liquid fuel and the air or oxygen in the internal space of the second pipe 22 (i.e., the first reacting region 23) may be withdrawn from the internal space of the body 37 to the outside, penetrating through the sealing cap 38.

For this, the sealing cap 38 includes a second through-hole 38a for connecting the conflux pipe 91 to the inlet 25a, a third through-hole 38b for withdrawing the second passing member 35 from the internal space to the outside, a fourth through-hole 38c for connecting the fourth supply pipe 84 to the outlet 32a, and a fifth through-hole 38d for withdrawing the first passing member 34 from the internal space to the outside.

Figure 5:
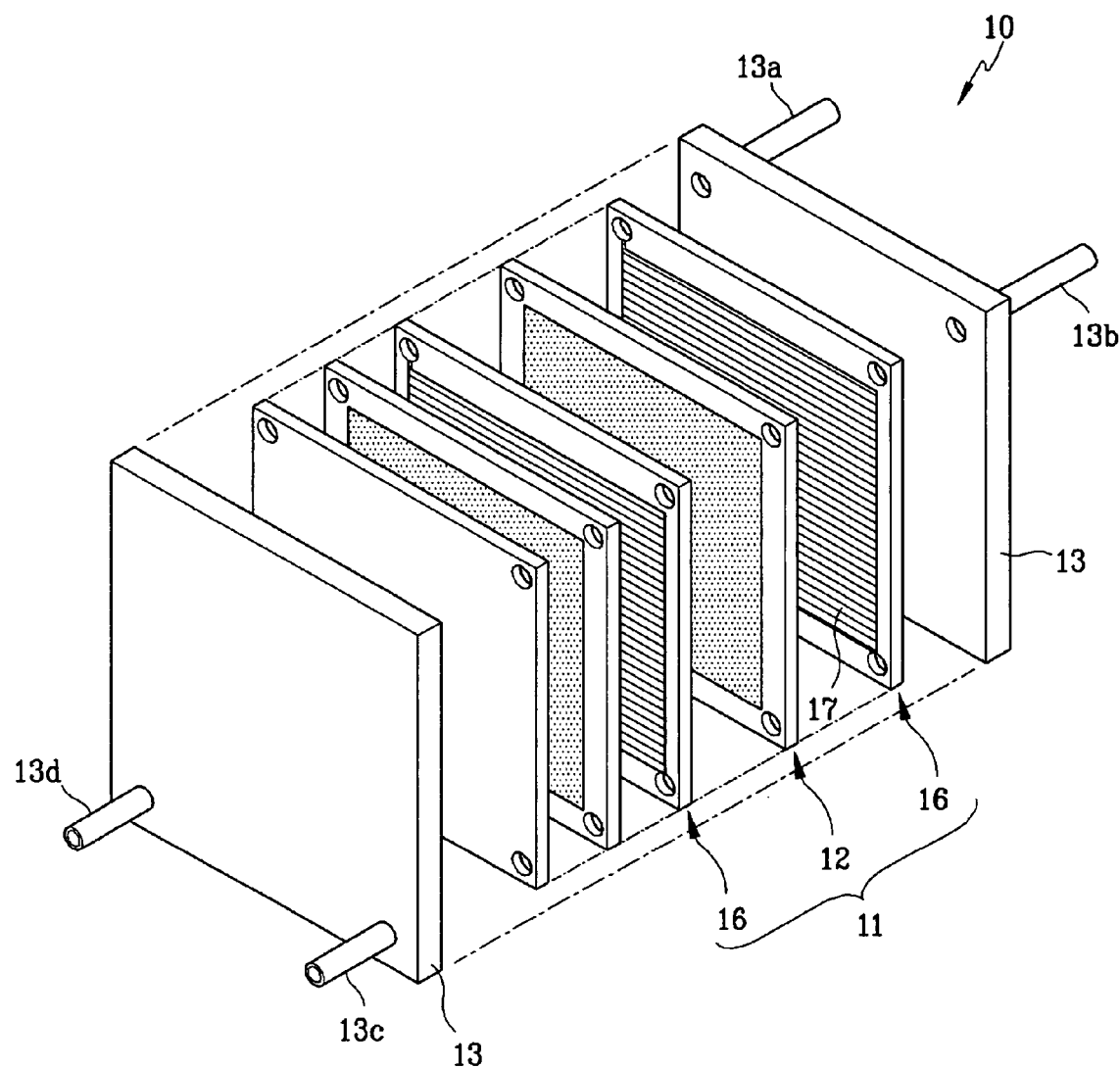
FIG. 5 is an exploded perspective view illustrating a structure of a fuel cell stack shown in FIG. 1.

FIG. 5 is an exploded perspective view illustrating a structure of a fuel cell stack shown in FIG. 1.

Referring to FIGS. 1 and 5, the fuel cell stack 10 of the fuel cell system 100 includes at least one electricity generator 11 that generates electricity through an oxidation/reduction reaction between the hydrogen gas produced in the reformer 20 and the oxidant.

The electricity generator 11 forms a unit cell which is the minimum unit for generating power and includes a membrane-electrode assembly 12 interposed between separators 16. A plurality of the unit cells are put together to form the fuel cell stack 10 shown in the present embodiment.

Pressing plates 13 may be mounted additionally in the outermost parts of the fuel cell stack 10 to make a plurality of the electricity generators 11 closely adhere to each other.

The fuel cell stack 10 may not include the pressing plates 13 and may alternatively use the separators 16 positioned in the outermost parts of the electricity generators 11 as the pressing plates 13.

Also, it is possible to form the pressing plates 13 to have the unique function of the separators 16, which will be described hereinafter, in addition to the function of making the electricity generators 11 closely adhere to each other.

The membrane-electrode assembly 12 includes an anode and a cathode on both sides and includes an electrolyte membrane between the two electrodes.

The anode oxidizes the hydrogen gas and discharges electrons generated from the oxidation to the outside. The flow of the electrons generates electricity and protons are transferred to the cathode through the electrolyte membrane.

The cathode produces water from a reaction between the protons, electrons, and oxygen.

The electrolyte membrane performs ion exchange by transferring the protons produced in the anode to the cathode.

The separators 16 serve as paths for supplying the hydrogen gas and air (or oxygen), which are required for an oxidation/reduction reaction in the membrane-electrode assembly 12, to the anode and the cathode, and the separators 16 also serve as conductors for connecting the anode to the cathode serially.

To be specific, the separators 16 have flow channels 17 that include a hydrogen path for supplying hydrogen gas to the anode on a surface contacting the anode of the membrane-electrode assembly 12, and an air (or oxygen) path for supplying air (or oxygen) to the cathode on a surface contacting the cathode of the membrane-electrode assembly 12.

The pressing plates 13 include a first inlet 13a for supplying hydrogen gas to the hydrogen path of the separators 16, a second inlet 13b for supplying air to the air path of the separators 16, a first outlet 13c for discharging hydrogen gas left behind after a reaction in the anode of the membrane-electrode assembly 12, and a second outlet 13d for discharging air left behind after a combination reaction between hydrogen and oxygen in the cathode of the membrane-electrode assembly 12.

The first inlet 13a is connected to the outlet 32a of the first pipe 21 of the reformer 20 through the fourth supply pipe 84. The second inlet 13b is connected to the air pump 71 through a fifth supply pipe 85.

As an alternative, the first outlet 13c may be connected to the inlet 25a of the second pipe 22 of the reformer 20 through an additional pipe (not shown).

Hereinafter, the assembly sequence of the reformer 20 and the operation of the entire fuel cell system 100 will be described in accordance with an embodiment of the present invention.

According to the present embodiment, the reformer 20 is assembled by combining a first cap 25 with one end of the second pipe 22, and disposing the second pipe 22 in the internal space of the first pipe 21.

Herein, the second pipe 22 may be arranged at the center of the first pipe 21 in the longitudinal direction.

Subsequently, the conflux pipe 91 connected to the first tank 51 and the air pump 71 penetrates through the second through-hole 38a of the sealing cap 38 and the first through-hole 21a formed in the first pipe 21 to be connected to the inlet 25a of the first cap 25.

Subsequently, the fourth cap 32 is combined with one end of the first pipe 21 and the fourth supply pipe 84 combined with the first inlet 13a of the fuel cell stack 10 passes through the fourth through-hole 38c of the sealing cap 38 to be connected to the outlet 32a of the fourth cap 32.

Subsequently, a WGS catalyst 29 and a reforming catalyst 28 are arranged sequentially in a space between the first pipe 21 and the second pipe 22. Then, the third cap 31 is combined with the other end of the first pipe 21 while the other end of the second pipe 22 penetrates through the penetrating opening 31b of the third cap 31.

While an oxidation catalyst 24 is arranged in the internal space of the second pipe 22, the second cap 26 is combined with the other end of the second pipe 22.

Subsequently, one end of the first passing member 34 is connected to the outlet 26a of the second cap 26. While the first passing member 34 coils around the external circumferential surface of the first pipe 21 spirally, the other end of the first passing member 34 penetrates through the fifth through-hole 38d of the sealing cap 38.

One end of the second passing member 35 is combined with the inlets 31a of the third cap 31, and the second passing member 35 coils around the external circumferential surface of the first pipe 21.

The second passing member 35 contacts the first passing member 34 wound up in the external circumferential surface of the first pipe 21.

Subsequently, the other end of the second passing member 35 penetrates the third through-hole 38b of the sealing cap 38.

Then, the entire first pipe 21 is inserted into the internal space of the body 37 of the adiabatic part 36. An open end of the body 37 is combined with a sealing cap 38 to seal the internal space of the body 37.

As described above, with the reformer 20 assembled according to the present embodiment, the fuel pump 55 is operated to provide the liquid fuel stored in the first tank 51 to the internal space of the second pipe 22 through the first supply pipe 81.

At the same time, the air pump 71 is operated to provide air to the internal space of the second pipe 22 through the third supply pipe 83.

The liquid fuel and the air passing through the first supply pipe 81 joins together in the conflux pipe 91 to be injected to the internal space of the second pipe 22.

The liquid fuel and the air pass through the oxidation catalyst 24 in the second pipe 22 and involve a catalytic oxidation reaction.

The liquid fuel and air are combusted through the catalytic oxidation reaction to produce heat of a predetermined temperature in the inside of the second pipe 22.

The heat is transferred to the space between the first pipe 21 and the second pipe 22 through the second pipe 22.

The combustion gas of a relatively high temperature produced in the second pipe 22 is exhausted through the first passing member 34.

Then, the first passing member 34 is heated up to a predetermined temperature by the heat of the combustion gas.

The fuel pump 55 is operated to supply the liquid fuel stored in the first tank 51 and the water stored in the second tank 53 to the second passing member 35 through the second supply pipe 82.

Since the second passing member 35 keeps contacting the first passing member 34 heated up to a predetermined temperature, the fuel mixture of the liquid fuel and the water passing through the second passing member 35 is primarily heated to a predetermined temperature by the heat generated and transferred from the first passing member 34.

The fuel mixture heated up primarily is injected into the space between the first pipe 21 and the second pipe 22 through the second passing member 35. The fuel mixture passes through the reforming catalyst 28 in the space to thereby absorb the heat energy provided by the second pipe 22.

Through the process, the fuel mixture is decomposed by the reforming catalyst 28 in the internal space between the first pipe 21 and the second pipe 22 to produce hydrogen gas containing carbon dioxide and hydrogen.

The reforming catalyst reaction produces hydrogen gas containing carbon monoxide as a byproduct in the space between the first pipe 21 and the second pipe 22.

Subsequently, the hydrogen gas passes through the WGS catalyst 29.

In the region adjacent to the outlet 32a of the first pipe 21, hydrogen gas is generated additionally through the WGS catalyst reaction and the concentration of carbon monoxide included in the hydrogen gas is reduced.

Through the process, the heat generated in the first reacting region 23, that is, in the internal space of the second pipe 22, is insulated by the adiabatic part 36 and not emitted outside in the present embodiment.

The heat energy generated in the first reacting region 23 is primarily insulated by the inner wall 37a of the body 37 of the adiabatic part 36 and then secondarily insulated by the vacuum space between the inner wall 37a and the outer wall 37b, while the heat energy of the first reacting region 23 is transferred to the second reacting region 27 and the heat transfer unit 33.

Since the adiabatic part 36 prevents the heat energy generated in the first reacting region 23 from being lost, the reaction efficiency and the thermal efficiency of the reformer 20 can be improved.

Subsequently, the hydrogen gas with reduced concentration of carbon monoxide is supplied to the first inlet 13a of the fuel cell stack 10 through the fourth supply pipe 84.

At the same time, the air pump 71 is operated to supply the air to the second inlet 13b of the fuel cell stack 10 through the fifth supply pipe 85.

The hydrogen gas is supplied to the anode of the membrane-electrode assembly 12 through the hydrogen paths of the separators 16.

The air is supplied to the cathode of the membrane-electrode assembly 12 through the air paths of the separators 16.

At the anode, the hydrogen gas is decomposed into electrons and protons through an oxidation reaction.

Protons are transferred to the cathode through the electrolyte membrane, and the electrons that cannot pass through the electrolyte membrane are transferred to the cathode of the membrane-electrode assembly 12 through the separators 16. Herein, the flow of the electrons generates electricity and generates heat and water as byproducts.

Figure 6:
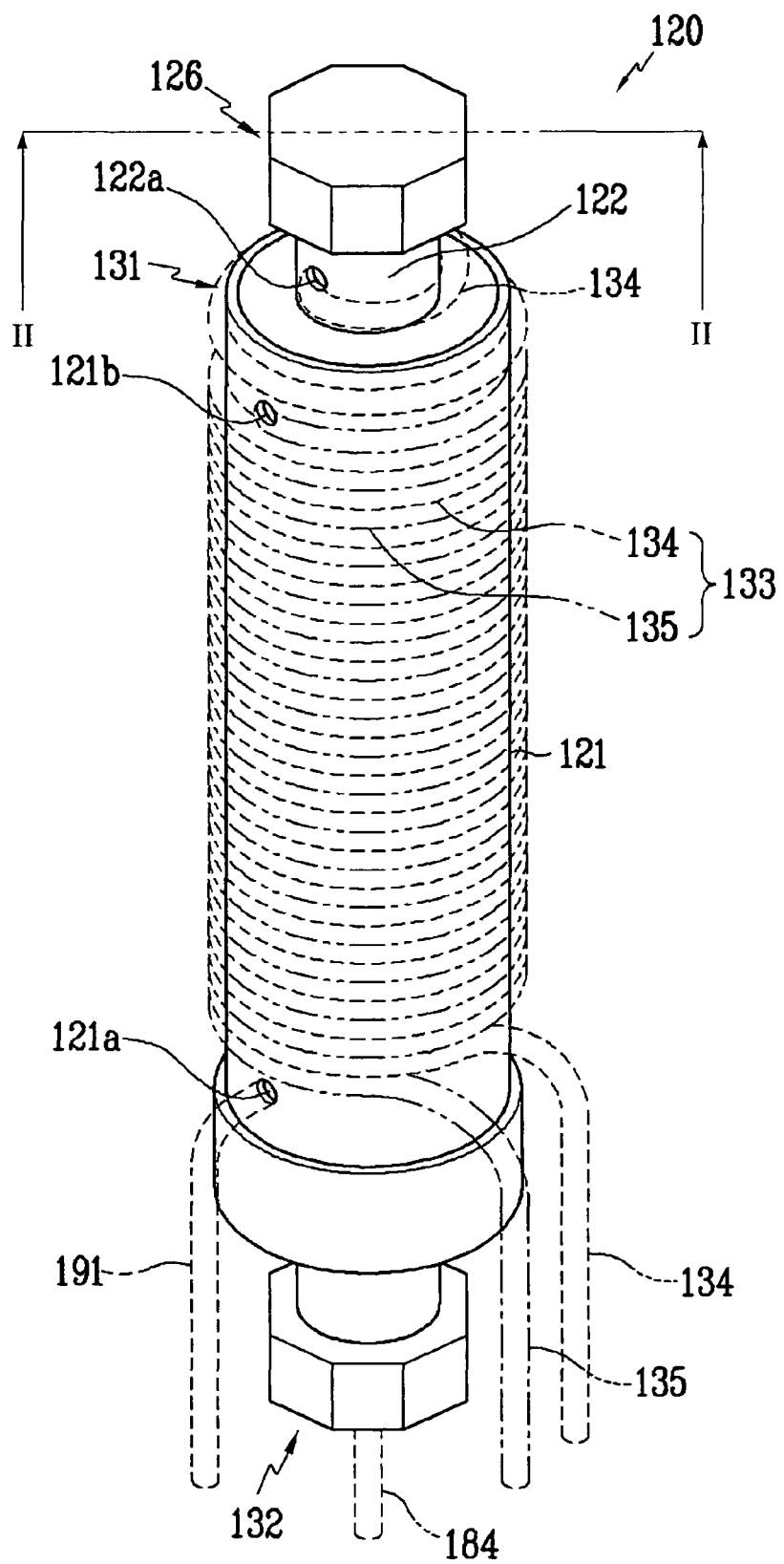
FIG. 6 is a perspective view showing a structure of a reformer in accordance with a second embodiment of the present invention.
Figure 7:
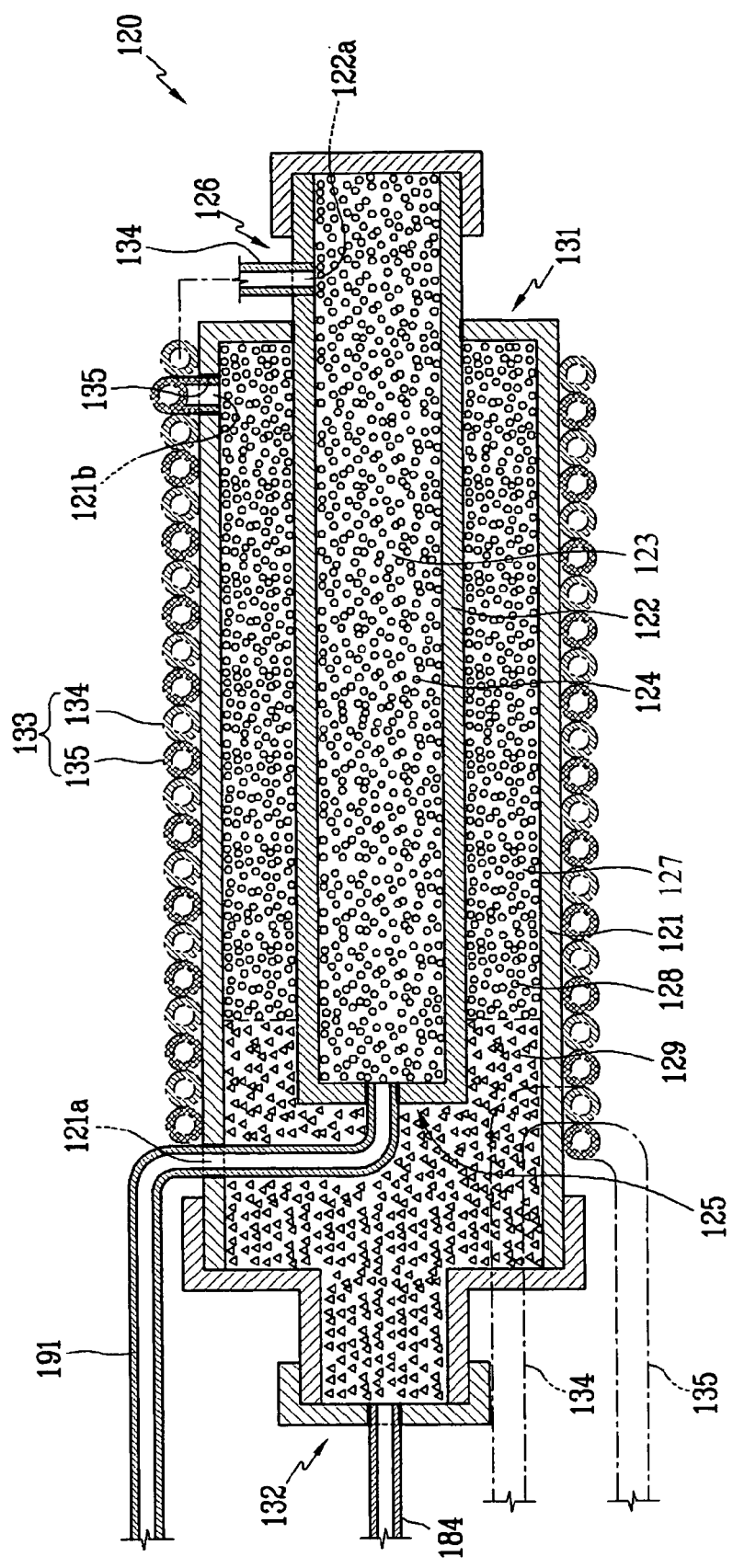
FIG. 7 is a cross-sectional view at line II-II of the reformer of FIG. 6.

FIG. 6 is a perspective view showing a structure of a reformer in accordance with a second embodiment of the present invention, and FIG. 7 is a cross-sectional view at line II-II of the reformer of FIG. 6.

Referring to the drawing, the reformer 120 includes a first reacting region 123 that generates heat energy through a catalytic oxidation reaction between the liquid fuel and air and a second reacting region 127 that generates hydrogen gas from the fuel mixture through a catalytic reforming reaction by the heat energy and reduces the concentration of carbon monoxide included in the hydrogen gas.

The reformer 120 includes a first pipe 121 and a second pipe 122 positioned in the inside of the first pipe 121.

The first reacting region 123 can be the internal space of the second pipe 122, and the second reacting region 127 can be the space between the first pipe 121 and the second pipe 122. The first reacting region 123 includes an oxidation catalyst 124 arranged in the internal space of the second pipe 122, an inlet 125 at one end of the second pipe 122, and an outlet 126 at the other end.

The inlet 125 is an opening for injecting liquid fuel and air into the internal space of the second pipe 122, and the outlet 126 is an opening for discharging combustion gas produced from a catalytic oxidation reaction between the liquid fuel and the air to the outside of the internal space.

The inlet 125 of the second pipe 122 is connected to a supply pipe 191 for supplying the fuel and the air.

The supply pipe 191 may pass through the first pipe 121 to be connected to the inlet 125.

For this, the first pipe 121 includes a first through-hole 121a for letting the supply pipe 191 pass therethrough.

A reforming catalyst 128 is arranged in the space between the first pipe 121 and the second pipe 122 (i.e., the second reacting region 127), and an inlet 131a and an outlet 132 are formed at one end and at the other end of the first pipe 121, respectively.

The inlet 131 is an opening for injecting the fuel mixture of the liquid fuel and water into the space between the first pipe 121 and the second pipe 122, and the outlet 132 is an opening for discharging hydrogen gas produced from the reforming catalyst reaction of the fuel mixture to the outside of the internal space.

The outlet 132 of the first pipe 121 is connected to a discharge pipe 184 for discharging the hydrogen gas.

As illustrated in the drawing, the second reacting region 127 may further include a WGS catalyst 129 positioned next to the reforming catalyst 128 in the space between the first pipe 121 and the second pipe 122. That is, the reforming catalyst 128 and the WGS catalyst 129 are sequentially arranged in the second reacting region 127.

The WGS catalyst 129 has a function of reducing the concentration of carbon monoxide included in the hydrogen gas, which is produced by the reforming catalyst 128, through a WGS reaction.

According to the present embodiment, the reformer 120 includes a heat transfer unit 133 for transferring the heat energy generated in the first reacting region 123 to the second reacting region 127 and to the fuel mixture supplied to the second reacting region 127.

The heat transfer unit 133 includes a first passing member 134 that is communicated with the inside of the second pipe 122 (i.e., the first reacting region 123) and set up in contact with the external circumferential surface of the first pipe 121, and a second passing member 135 that is communicated with the space between the first pipe 121 and the second pipe 122 (i.e., the second reacting region 127) and set up in contact with the external circumferential surface of the first pipe 121.

The first passing member 134 transfers the combustion gas of a relatively high temperature, which is produced from an oxidation reaction between the fuel and air in the oxidation catalyst 124 and discharged through the outlet 126 of the second pipe 122, to the external circumference of the first pipe 121.

The second passing member 135 supplies the fuel to the internal space between the first pipe 121 and the second pipe 122 through the inlet 131 of the first pipe 121 and transfers the heat energy of the combustion gas to the fuel mixture.

To be specific, the first and second passing members 134 and 135 coil around the external circumferential surface of the first pipe 121.

The first passing member 134 may be connected to a second through-hole 122a formed adjacent to the outlet 126 of the second pipe 122.

The second passing member 135 may be connected to a third through-hole 121b formed adjacent to the inlet 131 of the first pipe 121.

The first passing member 134 has its one end connected to the second through-hole 122a, and it coils around the external circumferential surface of the first pipe 121.

One end of the second passing member 135 is connected to the third through-hole 121b, and the second passing member 135 coils around the external circumferential surface of the first pipe 121 alternately with the first passing member 134.

Since the operation of the reformer of the present embodiment is the same as that of the previously described embodiment, a detailed description on the operation will not be provided herein.

Hereinafter, Examples, Reference Example, and Comparative Example of the present invention will be described.

The following Examples, however, are no more than examples of the present invention, and the scope of the present invention is not limited by the Examples.

EXAMPLES 1 AND 2, REFERENCE EXAMPLE 1 AND COMPARATIVE EXAMPLE 1

The reformer shown in FIG. 1 used a catalyst mixture prepared by mixing a Pd catalyst supported by an $Al_2O_3$ carrier and a Pt catalyst supported by an $Al_2O_3$ carrier in a volume ratio presented in Table 1 for oxidation. Herein, the supporting quantity of Pd was 1 wt %, and the supporting quantity of Pt was 1 wt %.

The concentration of carbon monoxide (CO) and oxidation initiation temperature in the reformer using the oxidation catalyst were measured for each of the Examples 1 and 2, Reference Example 1, and Comparative Example 1. The results are as shown in Table 1.

In Table 1, $Pt/Al_2O_3$ was the Pt catalyst supported by an $Al_2O_3$ carrier, and $Pd/Al_2O_3$ was the Pd catalyst supported by an $Al_2O_3$ carrier.

TABLE 1

| | $Pt/Al_2O_3$ (volume %) | $Pd/Al_2O_3$ (volume %) | CO concentration in reformer (%) | Oxidation initiation temperature |
|---|---|---|---|---|
| Example 1 | 10 | 90 | 1.5 | Room temperature |
| Example 2 | 1 | 99 | 0.8 | Room temperature |
| Reference Example 1 | 20 | 80 | 2.5 | Room temperature |
| Comparative Example 1 | 0 | 100 | 0.6 | 60□ |

As shown in Table 1, the reformers of Examples 1 and 2 having the mixture ratio of the $Pt/Al_2O_3$ catalyst to the $Pd/Al_2O_3$ catalyst of 1 to 10: 99 to 90 volume % had a little increased CO concentration, compared to the reformer of Comparative Example 1 not using the $Pt/Al_2O_3$ catalyst. However, since the oxidation was able to be performed at room temperature, the reformers of Examples 1 and 2 did not require an additional heater. This means that the structures of the reformers of Examples 1 and 2 can be simplified.

Also, the reformer of Reference Example 1 using a large amount of $Pt/Al_2O_3$ catalyst had a high CO concentration, which is not desirable.

Since the reformer for a fuel cell system can quickly transfer heat energy, which is needed for various reactions of the fuel, it can improve the performance and thermal efficiency of the entire fuel cell system.

Also, since it does not require an additional heater, the entire fuel cell system can be down-sized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a reformer in a fuel cell system, comprising:
   a Pd catalyst supported by a $Al_2O_3$ carrier; and
   a Pt catalyst supported by the $Al_2O_3$ carrier; and
   a mixing ratio of the Pd catalyst supported by the $Al_2O_3$ carrier to the Pt catalyst supported by the $Al_2O_3$ carrier is 90:10 to 99:1 volume %.

2. The catalyst of claim 1, wherein a content of the Pd catalyst supported by the $Al_2O_3$ carrier ranges from 0.5 to 1.5 wt %, and a content of the Pt catalyst supported by the $Al_2O_3$ carrier ranges from 0.5 to 1.5 wt %.

3. A reformer for a fuel cell system, comprising:
   a first reacting region generating heat energy through oxidation of a fuel, the first reacting region including an oxidation catalyst having a Pd catalyst supported by a $Al_2O_3$ carrier and a Pt catalyst supported by the $Al_2O_3$ carrier; and
   a mixing ratio of the Pd catalyst supported by the $Al_2O_3$ carrier to the Pt catalyst supported by the $Al_2O_3$ carrier is 90:10 to 99:1 volume %; and
   a second reacting region having an independent space from the first reacting region, the second reacting region generating hydrogen gas from the fuel through a reforming reaction by the heat energy.

4. The reformer of claim 3, wherein a content of the Pd catalyst supported by the $Al_2O_3$ carrier ranges from 0.5 to 1.5 wt %, and a content of the Pt catalyst supported by the $Al_2O_3$ carrier ranges from 0.5 to 1.5 wt %.

5. The reformer of claim 3, wherein the reformer includes a first pipe and a second pipe inserted into the first pipe, an internal space of the second pipe defines the first reacting region, and a space between the first pipe and the second pipe defines the second reacting region.

6. The reformer of claim 3, wherein the second reacting region includes a reforming catalyst for generating hydrogen gas from the fuel through a catalytic reforming reaction.

7. The reformer of claim 3, wherein the second reacting region includes a reforming catalyst for generating hydrogen gas from the fuel based on a catalytic reforming reaction, and a water gas shift (WGS) catalyst for reducing a concentration of carbon monoxide (CO) included in the hydrogen gas.

8. The reformer of claim 5, further comprising a heat transfer unit for transferring the heat energy generated in the first reacting region to the fuel supplied to the second reacting region.

9. The reformer of claim 8, wherein the heat transfer unit comprises:
   a first passing member coiling around an external circumferential surface of the first pipe and being communicated with the first reacting region; and
   a second passing member coiling around an external circumferential surface of the first pipe to contact the first passing member and being communicated with the second reacting region.

10. A fuel cell system, comprising:
    a reformer for producing hydrogen gas from fuel generating hydrogen gas through a catalytic chemical reaction by heat energy, the reformer comprising:
      a first reacting region generating heat energy through oxidation of a fuel, the first reacting region including an oxidation catalyst having a Pd catalyst supported by a $Al_2O_3$ carrier and a Pt catalyst supported by the $Al_2O_3$ carrier; and
      a mixing ratio of the Pd catalyst supported by the $Al_2O_3$ carrier to the Pt catalyst supported by the $Al_2O_3$ carrier is 90:10 to 99:1 volume %;
      a second reacting region having an independent space from the first reacting region, the second reacting region generating hydrogen gas from the fuel through a reforming reaction by the heat energy; and
    at least one electricity generator for generating electrical energy through an electrochemical reaction between the hydrogen gas and oxidant.

11. The fuel cell system of claim 10, wherein a content of the Pd catalyst supported by the $Al_2O_3$ carrier ranges from 0.5 to 1.5 wt %, and a content of the Pt catalyst supported by the $Al_2O_3$ carrier ranges from 0.5 to 1.5 wt %.

12. The fuel cell system of claim 10, wherein the reformer includes a first pipe and a second pipe inserted into the first pipe, an internal space of the second pipe defines the first reacting region, and a space between the first pipe and the second pipe defines the second reacting region.

13. The fuel cell system of claim 10, wherein the second reacting region includes a reforming catalyst for generating hydrogen gas from the fuel through a catalytic reforming reaction.

14. The fuel cell system of claim 10, wherein the second reacting region includes a reforming catalyst for generating the hydrogen gas from the fuel through a catalytic reforming reaction, and a WGS catalyst for reducing a concentration of carbon monoxide included in the hydrogen gas.

15. The fuel cell system of claim 10, further comprising a heat transfer unit for transferring the heat energy generated in the first reacting region to the fuel supplied to the second reacting region.

16. The fuel cell system of claim 12, further comprising a heat transfer unit for transferring the heat energy generated in the first reacting region to the fuel supplied to the second reacting region.

17. The reformer of claim 16, wherein the heat transfer unit comprises:
    a first passing member coiling around an external circumferential surface of the first pipe and being communicated with the first reacting region; and
    a second passing member coiling around an external circumferential surface of the first pipe to contact the first passing member and being communicated with the second reacting region.

* * * * *